Figure 1:
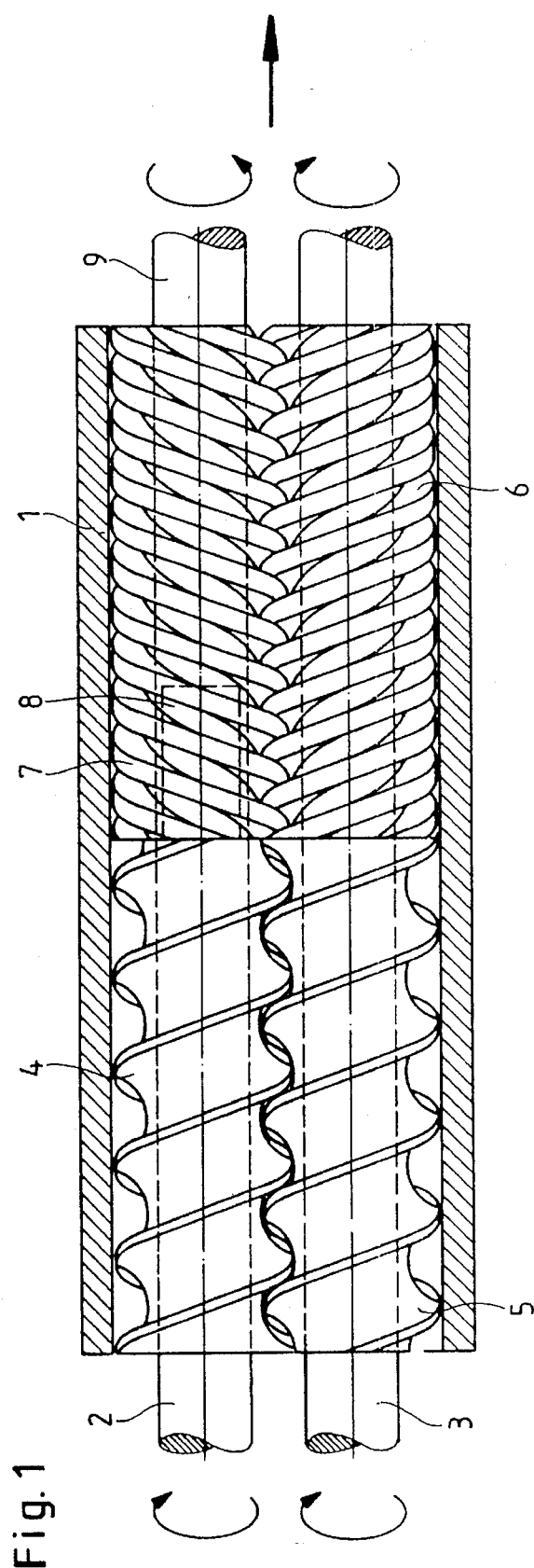

United States Patent [19]

Kohlgrüber

[11] Patent Number: 5,603,565
[45] Date of Patent: Feb. 18, 1997

[54] MULTI-SHAFT WORM MACHINE HAVING UNIFORMLY TWISTING AND COUNTERTWISTING WORM ELEMENTS

[75] Inventor: Klemens Kohlgrüber, Kürten, Germany

[73] Assignee: Bayer Aktiengesellschaft, Leverkusen, Germany

[21] Appl. No.: 510,152

[22] Filed: Aug. 2, 1995

[30] Foreign Application Priority Data

Aug. 9, 1994 [DE] Germany .............. 44 28 105.6

[51] Int. Cl.⁶ .................. B29B 7/48; B29B 1/10
[52] U.S. Cl. .................................. 366/85
[58] Field of Search ............ 366/84, 85, 86, 366/83, 292, 297, 298, 299, 300, 301; 425/208, 209

[56] References Cited

U.S. PATENT DOCUMENTS 3,929,323 12/1975 Smith ............... 366/85
4,752,135 6/1988 Loomans ............... 366/85
5,153,009 10/1992 Voigt .
5,409,366 4/1995 Vincent ............... 366/85

OTHER PUBLICATIONS

R. Erdmenger, Chemie–Ing.–Techn., vol. 36, No. 3, pp. 175–185, Jan. (1964).

Primary Examiner—Robert W. Jenkins
Attorney, Agent, or Firm—Sprung Horn Kramer & Woods

[57] ABSTRACT

In a multi-shaft worm machine comprising a plurality of worm shafts rotating in the same or in opposite directions, at least one worm fitting (6) is positively connected to the associated worm shaft (3), while a countertwisting element (7) is supported in a freely rotatable manner on the opposing worm shaft portion and is driven in the opposite direction of rotation by the worm shaft (3) of the positively connected worm fitting 6.

6 Claims, 3 Drawing Sheets

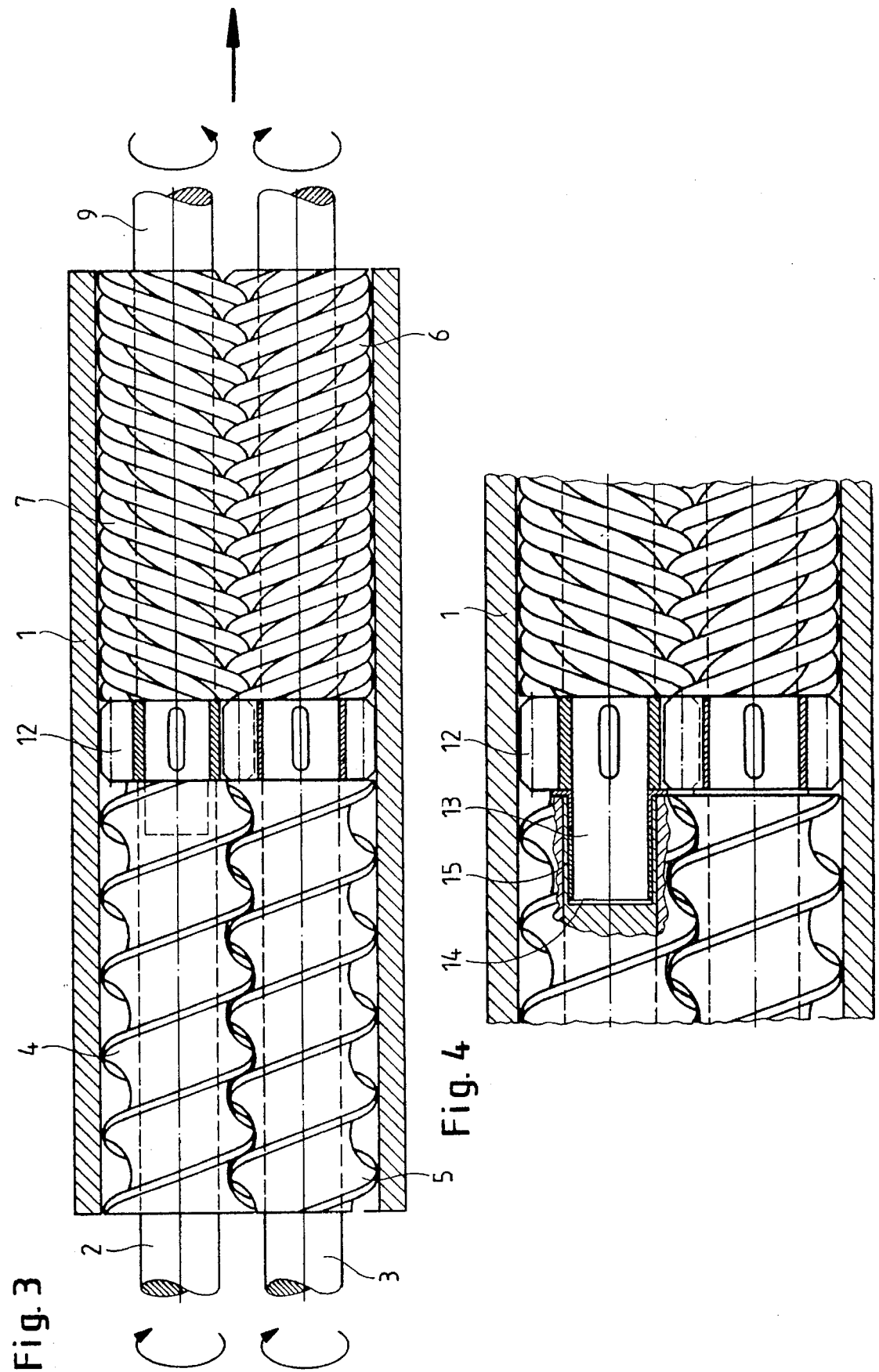

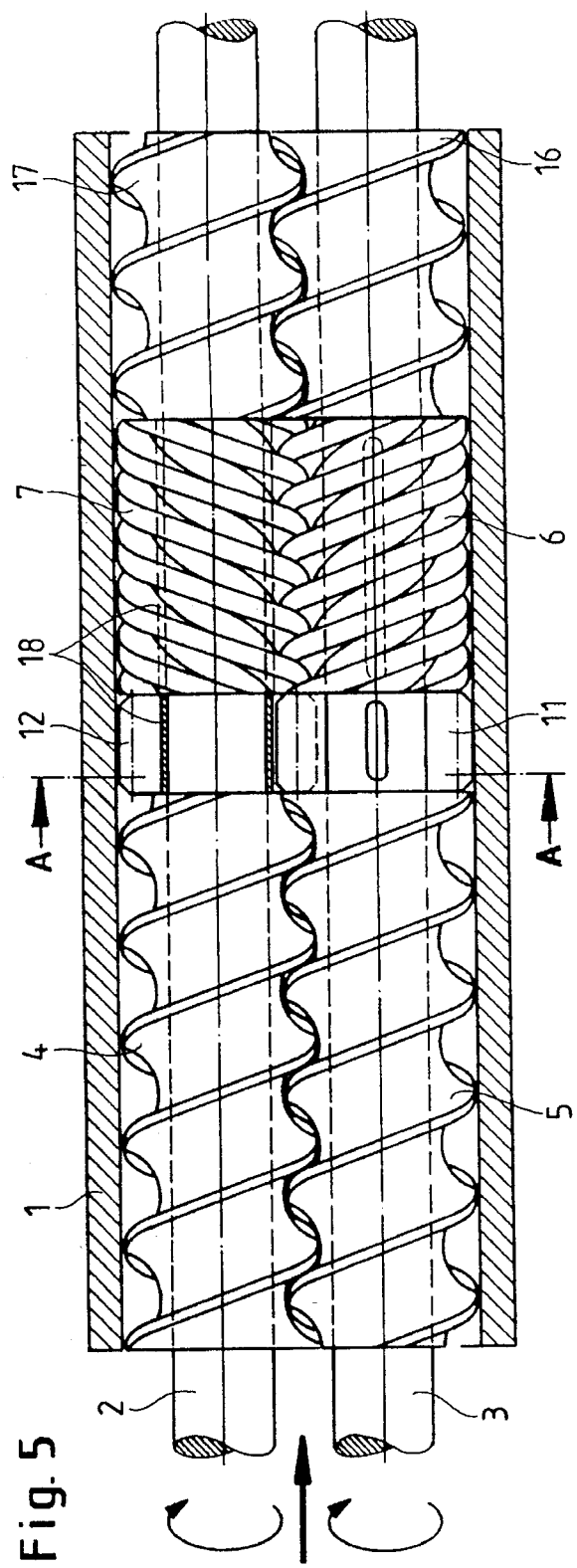
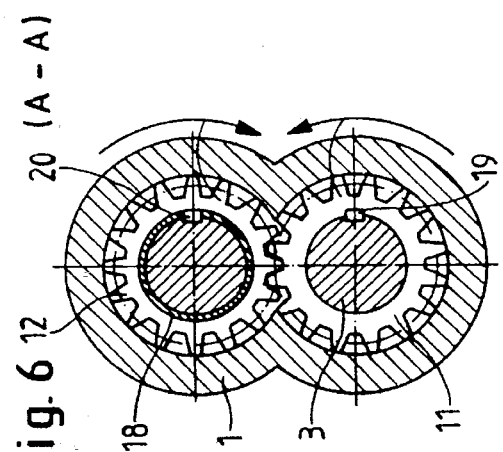

MULTI-SHAFT WORM MACHINE HAVING UNIFORMLY TWISTING AND COUNTERTWISTING WORM ELEMENTS

The invention relates to a multi-shaft worm machine, having a housing and a motor for driving a plurality of worm shafts, which rotate in the same direction or in opposite directions and are equipped with helical, meshed worm fittings for conveying products. Furthermore, the worm shafts may also be fitted with other worm shaft fittings, e.g. cam plates for mixing and kneading as well as lefthanded threaded portions or baffle plates. Worm elements and worm fittings are described, for example, in H. Hermann, "Worm machines in the field of materials processing", Springer Verlag 1972.

Twin-shaft worm machines are designed as either uniformly twisting or countertwisting worms. In the case of uniformly twisting worms, the two meshed worms have the same sense of helix (both lefthanded or both righthanded) and are driven in the same direction of rotation. In the case of countertwisting worms, one worm element is lefthanded and the other is righthanded, i.e. the worm elements have opposing senses of helix, and are also driven in opposite directions, i.e. in opposite directions of rotation. In multi-shaft worm machines, the drive motor is in principle always coupled to the worm shafts.

It is known that twin-shaft, uniformly twisting worms are highly effective for mixing products but their pumping efficiency is relatively poor. Conversely, countertwisting worms have a better pumping action but a poorer mixing action. In chemical process technology, therefore, depending on the job in question either uniformly twisting or countertwisting worm machines are used. For processes involving a succession of processing stages of said type, various types of worm machine are then arranged in tandem as individual installations each with an independent drive. The transfer of material between the individual machines is effected by speed-controlled metering pumps.

This is where the invention comes. The basic object is, through modified machine construction, to widen the range of application of multi-shaft worm machines in chemical process technology. In particular, the advantages of uniformly twisting and countertwisting worms are to be combined with one another.

According to the invention, said object is achieved in a multi-shaft worm machine having a housing and a drive motor in that at least one worm fitting is positively connected to the associated shaft, while a countertwisting element is supported in a freely rotatable manner on the opposing worm shaft portion and is driven in the opposite direction of rotation by the worm shaft having the positively connected worm fitting. "Positively connected" means that the worm fitting may be slipped or mounted onto the shaft but is locked against rotation. In contrast, the opposing countertwisting element is supported in a freely rotatable manner on the shaft. The countertwisting element therefore has a sense of helix which is the opposite of the sense of helix of the previously described worm fitting.

The effect thereby achieved is that in a worm machine having a housing and a drive motor uniformly twisting portions and countertwisting portions may directly succeed one another.

The requirement for the countertwisting element to be freely rotatable may be met in that the worm shaft is interrupted in the region of the countertwisting element and that the countertwisting element at one part is supported by a part of its length in a freely rotatable manner on the end portion of the worm shaft and at its other end is positively connected to the extended part of the worm shaft. The extended worm shaft then rotates relative to the preceding part in the opposite direction of rotation.

Alternatively, said requirement may be met in that the countertwisting element is supported rotatably on a continuous worm shaft.

In the solutions described above, it is assumed that the worm fitting on the driven shaft engages into and drives the countertwisting element. Said drive, which leads to a change in the direction of rotation, gives rise to thrust forces, with the result that the worm flanks are subjected to relatively high stress. According to a preferred variant of the invention, said drawback is eliminated by disposing on the shaft with the positively connected worm fitting a likewise positively connected gear wheel which drives a mating gear wheel, which is freely rotatable on the opposing shaft and is firmly connected to the countertwisting element which is likewise freely rotatable about said shaft. In said case, the countertwisting element is therefore driven not directly by the opposing worm fitting but via an integrated gear train.

In an identical manner to conventional worm fitting elements, the gear wheels may advantageously be mounted or slipped onto the worm shafts.

The following advantages are achieved by the invention:

With a relatively low outlay in terms of mechanical engineering, the invention makes it possible to realize a worm machine, in which uniformly twisting and countertwisting zones are accommodated in one housing and only a single drive is required. It is also possible to effect a change from uniform twisting to countertwisting and conversely from countertwisting to uniform twisting. Furthermore, uniformly twisting and countertwisting fittings may alternately succeed one another along the worm shafts.

The solution according to the invention is also compatible with all previous worm machine design principles. This has the advantage that existing installations may easily be retrofitted or modified.

Figure 2:
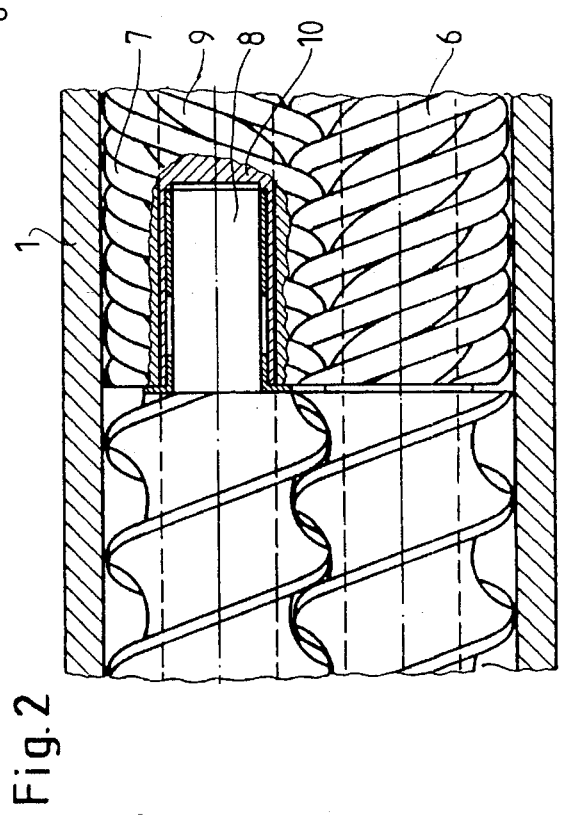

There follows a detailed description of the invention with reference to drawings and embodiments. The drawings show:

FIG. 1 the basic principle of a twin-shaft worm with a uniformly twisting portion and a countertwisting portion FIG. 2 the mounting of the countertwisting element in the case of an interrupted worm shaft FIG. 3 a uniformly twisting portion and a subsequent countertwisting portion with gear train FIG. 4 the mounting in the case of the gear train for the countertwisting portion FIG. 5 a worm shaft machine, in which uniformly twisting and countertwisting portions alternately succeed one another and FIG. 6 a cross-section A—A through the gear train according to FIG. 5.

The twin-shaft worm machine diagrammatically illustrated in FIG. 1 comprises the housing 1 and the two worm shafts 2 and 3 with the worm fittings 4, 5, 6 and 7 slipped onto the shafts. The worm fittings 4 and 5 are righthanded helical worms or conveying elements which are meshed with one another. The worm fitting 6 in the present case is a worm with a lower pitch (smaller lead). The worm fitting 7, on the other hand, is a lefthanded worm with the same pitch as the worm 6. The worms 4, 5 and 6 are positively connected to the worm shafts 2 and 3 and therefore co-rotate with the worm shafts. Unlike the worm shaft 3, the worm shaft 2 is interrupted in the region of the lefthanded worm 7. The lefthanded worm 7 is not connected to the shaft 2 but may rotate freely about the projecting end portion 8 of the shaft 2. Since the lefthanded worm 7 is meshed with the righthanded worm 6 on the shaft 3, it is driven by the flanks of the righthanded worm 6. Whereas the shafts 2 and 3 and hence also the worm fittings 4, 5 and 6 rotate in a clockwise direction in the manner indicated in FIG. 1, the righthanded worm 7 rotates in an anti-clockwise direction. The lefthanded worm 7 is therefore a countertwisting element. The worm shaft continues at the end of the countertwisting element. The extended part of the worm shaft is connected positively and in a friction-locked manner to the countertwisting element 7 and therefore rotates likewise in an anti-clockwise direction. The presently illustrated twin-shaft worm machine therefore comprises the uniformly twisting double-lead worm 4, 5 and the subsequent countertwisting double-lead worm 6, 7.

FIG. 2 illustrates the manner in which the countertwisting element is supported on the axle portion 8 (end piece of the worm shaft 2). For said purpose, the countertwisting element 7 is provided with a freely rotatable sleeve 10, which is slipped over the axle portion 8.

According to an alternative embodiment, the worm shaft 2 is not interrupted in the region of the countertwisting element but is continuous. The inside diameter of the axial bore in the countertwisting element 7 is required in said construction to have a sufficiently large clearance relative to the shaft 2 to allow the countertwisting element 7 to rotate in the opposite direction on the shaft 2.

In the combined uniformly twisting and countertwisting double-lead worm according to FIG. 1, thrust forces arise at the flanks of the contrarotating worm fittings 6 and 7, which forces may lead to a reduced service life. In a further-developed uniformly twisting and countertwisting worm, therefore, driving of the countertwisting element 7 is effected not via the worm flanks but via a gear train integrated into the worm machine (see FIG. 3). According to FIG. 3, two identical gear wheels 11 and 12 are slipped or mounted onto the shafts 2 and 3 adjacent to the uniformly twisting worm 4, 5. Whereas the gear wheel 11 is connected positively and in a friction-locked manner to the shaft 3, the gear wheel disposed on the opposing shaft 2 is freely rotatable and may therefore rotate in the opposite direction. At the transition point between the uniformly twisting worm 4 and the countertwisting element 7, the worm shaft 2 is once more interrupted. The gear wheel 12 and the countertwisting worm 7 are positively connected to the extended part 9 of the worm shaft 2. Thus, the gear wheel 11 via the gear wheel 12 drives the worm shaft extension 9 and hence also the countertwisting element in an anti-clockwise direction. In said construction, therefore, the countertwisting worms 6 and 7 need not be in contact at the worm flanks. The mating gear wheel 12 is, as already mentioned, supported in a freely rotatable manner on the end portion of the worm shaft 2. Said mounting may, in the manner shown in FIG. 4, be such that the gear wheel 12 rotates with an axle portion 13, over which a sleeve 15 is placed, in a bearing shell 14 at the end portion of the worm shaft 2.

A further embodiment is shown in FIGS. 5 and 6. Here, the twin-shaft worm machine has two continuous shafts 2 and 3, Following a first uniform twist zone comprising the worms 4 and 5 is a countertwist zone comprising the worms 6 and 7 (countertwisting element), which in turn is followed by a zone comprising uniformly twisting worms 16 and 17. As in the construction according to FIGS. 3 and 4, the countertwisting element is driven by the gear wheels 11, 12. Since the shaft 2 is continuous, the countertwisting element 7 and the gear wheel 12 are required to have a sufficiently large clearance relative to the shaft to allow said elements to rotate freely. The clearance relative to the shaft 2 is achieved by means of low-maintenance bearings. All other fitting elements, i.e. the uniformly twisting worms 4 and 5, the gear wheel 11, the countertwisting worm 6 and the subsequent uniformly twisting worms 16 and 17 are connected positively and in a friction-locked manner to the shafts 2 and 3. The countertwisting element 7 and the gear wheel 12 are supported on a distance sleeve 18, which is likewise positively connected to the shaft 2. The length of the distance sleeve 18 is so selected that a slight axial clearance remains between the countertwisting element 7 and the subsequent uniformly twisting worm 17. By said means, friction and material losses caused by abrasion between the two contrarotating worms 7 and 17 are minimized.

In FIG. 6, the gear train used to drive the countertwisting element 7 is illustrated once more in cross-section. The gear wheel 11 is positively connected by means of a tongue-and-groove fixing device 19 to the shaft 3, while the mating gear wheel 12 may rotate freely about the distance sleeve 18. The distance sleeve 18 is fixed by means of the tongue-and-groove joint 20 on the shaft 2. Such tongue-and-groove joints are customary for positively mounting fitting elements and are also known elsewhere.

The described embodiments relate to twin-shaft worm machines; it is however clear that the constructional measures according to the invention regarding alternating uniform twist and countertwist zones may also be applied in worm machines comprising more than two shafts. Taking the extrusion of plastic materials as an example, there follows a description of three typical processing steps which may be implemented in a multi-shaft worm machine having successive uniform twist and countertwist zones:

1. Melting

The melting of plastic granular material is advantageously effected in a uniformly twisting worm. In a countertwisting worm it is namely possible when conveying solids, e.g. granular material, for such high binding forces to arise that the worm is mechanically damaged or destroyed.

2. Mixing

The incorporation of additives (e.g. colouring substances for dyeing a plastic material) is advantageously effected in a uniformly twisting worm, since uniformly twisting worms possess better mixing properties than countertwisting worms.

3. Extrusion

Extrusion of the viscous thermoplastic worm through the die is advantageously effected by means of a countertwisting worm since said worm, with its greater pumping efficiency, may build up a higher pressure so that the, often sensitive, product is subjected to less stress.

I claim:

1. A multi-shaft worm machine comprising a housing (1) and a motor for rotating a plurality of worm shafts (2, 3) which are equipped with helical, meshed worm fittings for conveying products, at least one worm fitting (6) being positively connected to the associated shaft (3) in such a manner that the worm fitting may be slipped or mounted onto the shaft but is locked against rotation, while a countertwisting element (7) is supported in a freely rotatable manner on an opposing worm shaft portion and is driven in the opposite direction of rotation by the worm shaft (3) having the positively connected worm fitting (6).

2. A worm machine according to claim 1, wherein the worm shaft (2) is interrupted in the region of the countertwisting element (7) and the countertwisting element (7) at one end is supported by a part of its length in a freely rotatable manner on an end portion (8) of the worm shaft (2) and at its other end is positively connected to an extended part (9) of the worm shaft.

3. A worm machine according to claim 1, wherein the countertwisting element (7) is supported on a continuous worm shaft (2).

4. A worm machine according to claim 1, including a positively connected gear wheel (11) disposed on the shaft (3) along with the positively connected worm fitting (6), the gear wheel (11) driving a mating gear wheel (12) which is freely rotatable on the opposing shaft (2) and is firmly connected to the countertwisting element (7) which also is freely rotatable about said shaft (2).

5. A worm machine according to claim 4, wherein the gear wheels (11, 12) are designed as worm fitting elements.

6. A worm machine according to claim 1, wherein alternately uniformly twisting and countertwisting rotating fittings are successively disposed along the worm shafts (2, 3).

* * * * *